(12) United States Patent
Al-Jughaiman et al.

(10) Patent No.: US 12,463,808 B2
(45) Date of Patent: Nov. 4, 2025

(54) MACHINE LEARNING ENCRYPTION KEYS STORAGE SYSTEM AND METHOD

(71) Applicant: SAUDI ARABIAN OIL COMPANY, Dhahran (SA)

(72) Inventors: Mohammad Abdulrahman Al-Jughaiman, Al Khobar (SA); Abdulrahim Abdulhamid Aljahdali, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 117 days.

(21) Appl. No.: 18/420,154

(22) Filed: Jan. 23, 2024

(65) Prior Publication Data

US 2025/0240161 A1    Jul. 24, 2025

(51) Int. Cl.
  *H04L 9/08*  (2006.01)
  *H04L 9/14*  (2006.01)

(52) U.S. Cl.
  CPC .............. *H04L 9/0894* (2013.01); *H04L 9/14* (2013.01)

(58) Field of Classification Search
  CPC ................................ H04L 9/0894; H04L 9/14
  See application file for complete search history.

(56) References Cited

U.S. PATENT DOCUMENTS

| | | | |
|---|---|---|---|
| 8,385,551 B2 | 2/2013 | Pourzandi et al. | |
| 8,631,507 B2 | 1/2014 | Brickell | |
| 9,740,867 B2 | 8/2017 | Nelson et al. | |
| 2009/0210456 A1 | 8/2009 | Subramaniam | |
| 2022/0214903 A1 | 7/2022 | Zhao et al. | |
| 2022/0393869 A1* | 12/2022 | Baldwin | H04L 9/0825 |
| 2024/0291654 A1* | 8/2024 | Soler Garrido | G06F 21/64 |

FOREIGN PATENT DOCUMENTS

| | | |
|---|---|---|
| CN | 105933117 A1 | 9/2016 |
| WO | 02015084144 A1 | 6/2015 |

* cited by examiner

*Primary Examiner* — Izunna Okeke
(74) *Attorney, Agent, or Firm* — Leason Ellis LLP

(57) ABSTRACT

Automatic management of trusted platform module encryption recovery keys is disclosed. A first request is generated for a trusted platform module encryption recovery key and transmitted to a plurality of host computing devices. In response, copies of trusted platform module encryption recovery keys, each respectively associated with a trusted platform module, are received and stored in a storage vault. A second for a trusted platform module encryption recovery key is generated and transmitted to the plurality of host computing devices. In response, a copy of a trusted platform module encryption recovery key not previously received is received. Thereafter, the copy of the different key is determined to be not previously stored in the storage vault. The copy of the different trusted platform module encryption recovery key is stored in the storage vault.

15 Claims, 7 Drawing Sheets

MACHINE LEARNING ENCRYPTION KEYS STORAGE SYSTEM AND METHOD

FIELD OF THE DISCLOSURE

This patent application relates, generally, to security and, more particularly, to trusted platform module encryption key storage.

BACKGROUND OF THE DISCLOSURE

Many information technology ("IT") services, particularly in the enterprise, include hypervisors for which virtual machines are created and executed. Hypervisors can be at the core of the building block of private cloud IT services and often are equipped with a secure boot algorithm that utilizes a hardware-based trusted platform module. Due to operational requirements, such as a firmware upgrade or hardware changes, the trusted platform module requires modification, which can nullify the secure protection of the host effectively making the server unbootable.

Hypervisors are often equipped with a secure boot algorithm that utilizes a hardware based trusted platform module (TPM). Due to operational requirements such as firmware upgrade or hardware changes; the trusted platform module (TPM) can be modified which nullify the secure protection of the host effectively making the server unbootable. The administrator has to reinstall the hypervisor again and go to the process of reconfiguring the operating system which will extend the service outage. The server can be recovered without reinstallation by using certain encryption keys unique to each server. Such keys are referred to herein, generally, as TPM encryption recovery key.

In the event that a TPM is modified and the corresponding TPM encryption recovery key is lost or otherwise not available, an IT administrator reinstalls the hypervisor following a firmware upgrade, which includes a process of reconfiguring the operating system. Unfortunately, this extends IT service outage. Once completed, the server can be recovered without reinstallation by using certain encryption keys unique to each server. Particularly in the enterprise, the keys have to be vaulted to a secure place and not visible to the public.

It is with respect to these and other concerns that the present disclosure is provided.

SUMMARY OF THE DISCLOSURE

In one or more implementations of the present disclosure, a computer-implemented system and method for automatic management of trusted platform module encryption recovery keys are provided. At least one computing device configured by executing instructions stored on non-transitory processor readable media can generate a first request for a trusted platform module encryption recovery key. The at least one computing device can be configured to transmit to each of a plurality of host computing devices, the first request and receive, from each of the plurality of host computing devices in response to the first request, copies of trusted platform module encryption recovery keys. Each of the copies of the trusted platform module encryption recovery keys is respectively associated with a trusted platform module operating on a respective host device. Further, the at least one computing device can be configured to store each of the received trusted platform module encryption recovery keys in a storage vault. Moreover, the at least one computing device can be configured to generate a second request for a trusted platform module encryption recovery key and transmit the second request to the plurality of host computing devices. The at least one computing device can be configured to receive, from at least one of the plurality of host computing devices in response to the second request, a copy of a different trusted platform module encryption recovery key that was not previously received. Each copy of the different trusted platform module encryption recovery key is respectively associated with the at least one trusted platform module operating on the at least one of the plurality of host computing devices. Thereafter, the at least one computing device can be configured to determine that the copy of the different trusted platform module encryption recovery key was not previously stored in the storage vault. The at least one computing device can be further configured to store to the storage vault, the copy of the different trusted platform module encryption recovery key in the storage vault.

In one or more implementations of the present disclosure, the at least one computing device can be configured to receive, from the at least one of the plurality of host computing devices, information representing a plurality of possible events occurring on the at least one of the plurality of host computing devices resulting in generation of the different trusted platform module encryption recovery key. The at least one computing device can, thereafter, generate a respective probability of each of the plurality of events. As a function of the generated respective probabilities, one of the plurality of events that resulted in the generation of the different trusted platform module encryption recovery key is determined and information representing the one of the plurality of events is stored.

In one or more implementations of the present disclosure, the at least one computing device includes a machine learning model and wherein the determining is performed by the machine learning model.

In one or more implementations of the present disclosure, the at least one computing device can be configured to receive, from the at least one of the plurality of host computing devices, information associated with a plurality of events and process the information associated with the plurality of events to generate processed information. The at least one computing device can generate, using the processed information, respective prediction scores associated with each of the plurality of events. Determining the one of the plurality of events can be based on the respective prediction scores.

In one or more implementations of the present disclosure, processing the information associated with the plurality of events to generate processed information includes tokenization, vectorization, and embeddings.

In one or more implementations of the present disclosure, the request is generated as a function of at least one of a query and an application programming interface.

Additional features, advantages, and embodiments of the disclosure may be set forth or apparent from consideration of the detailed description and drawings. It is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

DETAILED DESCRIPTION OF CERTAIN EMBODIMENTS ACCORDING TO THE DISCLOSURE

By way of overview and introduction, the present disclosure presents method(s) and system(s) for automatically retrieving trusted platform module ("TPM") keys and storing the keys in a secure location, which is not visible to the public. More particularly, the present disclosure provides an automated method for retrieving TPM encryption recovery keys periodically and storing the keys securely in a vaulted system, without use of a separate computing device such as a server or drive. In one or more implementations, machine learning and artificial intelligence is provided for logging events which result in TMP key changes and the respective causes therefor.

Figure 1:
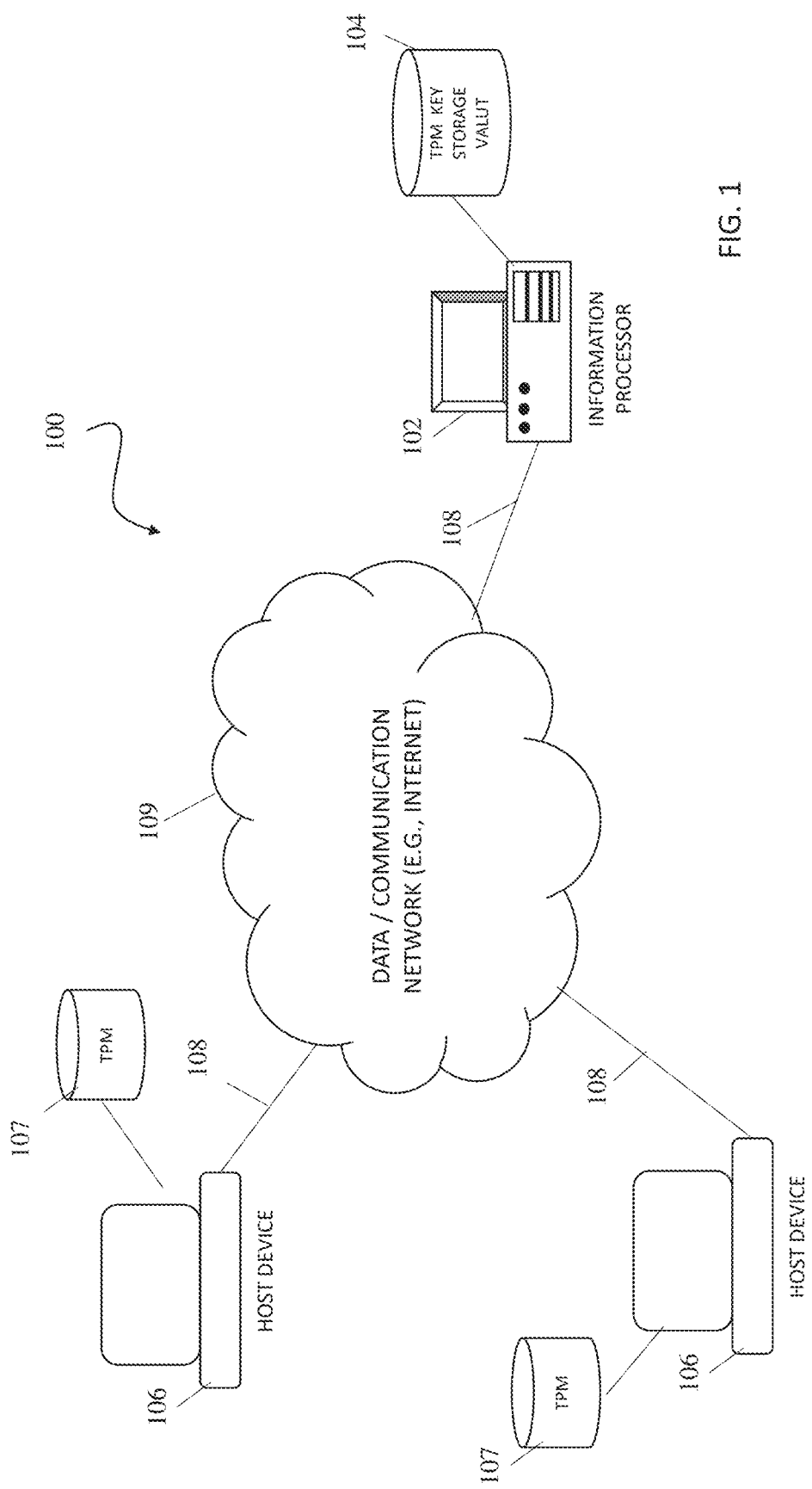
FIG. 1 is a block diagram that shows an example hardware arrangement that operates for providing the systems and methods disclosed herein.

Referring to FIG. 1, a diagram is provided that shows an example hardware arrangement that operates for providing the systems and methods disclosed herein and designated generally as system 100. System 100 can include information processor 102, which can be configured to execute a TPM encryption recovery key retrieval and storage application. In one or more implementations, information processor 102 can be coupled, at least communicatively, to TPM encryption recovery key storage vault 104. Moreover, system 100 can include one or more host devices 106, which includes TPM 107 and which can communicate with information processor 102 across communication network 109. Information processor 102 and host devices 106 can include, for example, mobile computing devices such as tablet computing devices, smartphones, personal digital assistants or the like, as well as laptop computers and/or desktop computers, server computers and mainframe computers. Further, one computing device may be configured as an information processor 102 and a host device 106, depending upon operations being executed at a particular time.

It is contemplated that information processor 102 can access one or more databases and/or devices via communication network 109 or any other communication network to which information processor 102 has access. Information processor 102 can communicate with devices comprising databases using any known communication method, including a direct serial, parallel, universal serial bus ("USB") interface, or via a local or wide area network. Host devices 106 can communicate with information processor 102 using data connections 108, which are respectively coupled to communication network 109. Communication network 109 can be any communication network, but typically is or includes the Internet or other computer network. Data connections 108 can be any known arrangement for accessing communication network 109, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

Host devices 106 preferably have the ability to send and receive data across communication network 109, and are equipped with web browsers, software disclosures, or other means, to provide received data on display devices incorporated therewith. By way of example, host device 106 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 109, and that wireless communication can be provided between wireless devices and information processor 102.

System 100 preferably includes software that provides functionality described in greater detail herein, and preferably resides on one or more information processors 102 and/or host devices 106. One of the functions performed by information processor 102 is that of operating as a web server and/or a web site host. Information processor 102 typically communicate with communication network 109 across a permanent i.e., un-switched data connection 108. Permanent connectivity ensures that access to devices 102 is always available.

Figure 2:
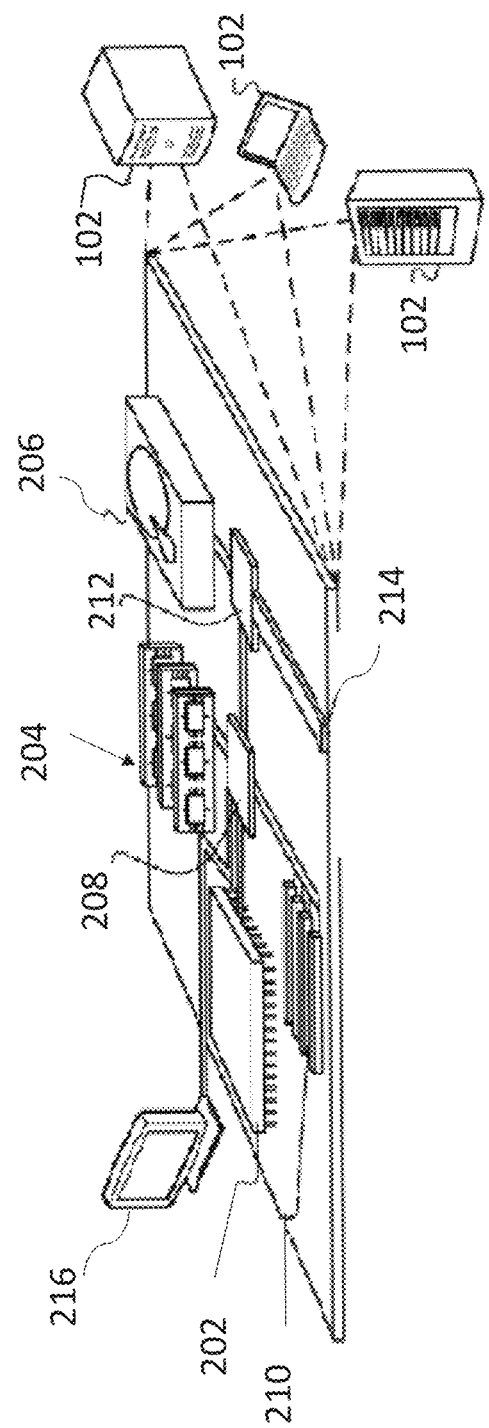
FIG. 2 shows an example information processor that can be used to implement the techniques described herein.

FIG. 2 shows an example information processor 102 that can be used to implement the techniques described herein. Information processor 102 is intended to represent various forms of digital computers, such as laptops, desktops, workstations, personal digital assistants, servers, blade servers, mainframes, and other appropriate computers. The components shown in FIG. 2, including connections and relationships, and their functions, are meant to be exemplary only, and are not meant to limit implementations of the inventions described and/or claimed in this document.

The information processor 102 can include a processor 202, a memory 204, a storage device 206, a high-speed interface 208 connecting to the memory 204 and multiple high-speed expansion ports 210, and a low-speed interface 212 connecting to a low-speed expansion port 214 and the storage device 206. Each of the processor 202, the memory 204, the storage device 206, the high-speed interface 208, the high-speed expansion ports 210, and the low-speed interface 212, are interconnected using various busses, and can be mounted on a common motherboard or in other manners as appropriate. The processor 202 can process instructions for execution within the information processor 102, including instructions stored in the memory 204 or on the storage device 206 to display graphical information for a GUI on an external input/output device, such as a display 216 coupled to the high-speed interface 208. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 204 stores information within the information processor 102. In some implementations, the memory 204 is a volatile memory unit or units. In some implementations, the memory 204 is a non-volatile memory unit or units. The memory 204 can also be another form of computer-readable medium, such as a magnetic or optical disk.

The storage device 206 is capable of providing mass storage for the information processor 102. In some implementations, the storage device 206 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 204, the storage device 206, or memory on the processor 202.

The high-speed interface 208 can be configured to manage bandwidth-intensive operations, while the low-speed interface 212 can be configured to manage lower bandwidth-intensive operations. Of course, one of ordinary skill in the art will recognize that such allocation of functions is exemplary only. In some implementations, the high-speed interface 208 is coupled to the memory 204, the display 216 (e.g., through a graphics processor or accelerator), and to the high-speed expansion ports 210, which can accept various expansion cards (not shown). In an implementation, the low-speed interface 212 is coupled to the storage device 206 and the low-speed expansion port 214. The low-speed expansion port 214, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

As noted herein, information processor 102 can be implemented in a number of different forms, such as a standard server, or multiple times in a group of such servers. In addition, it can be implemented in a personal computer such as a laptop computer. It can also be implemented as part of a rack server system. Alternatively, components from the computing device 200 can be combined with other components in a mobile device (not shown), such as a mobile computing device.

Figure 3:
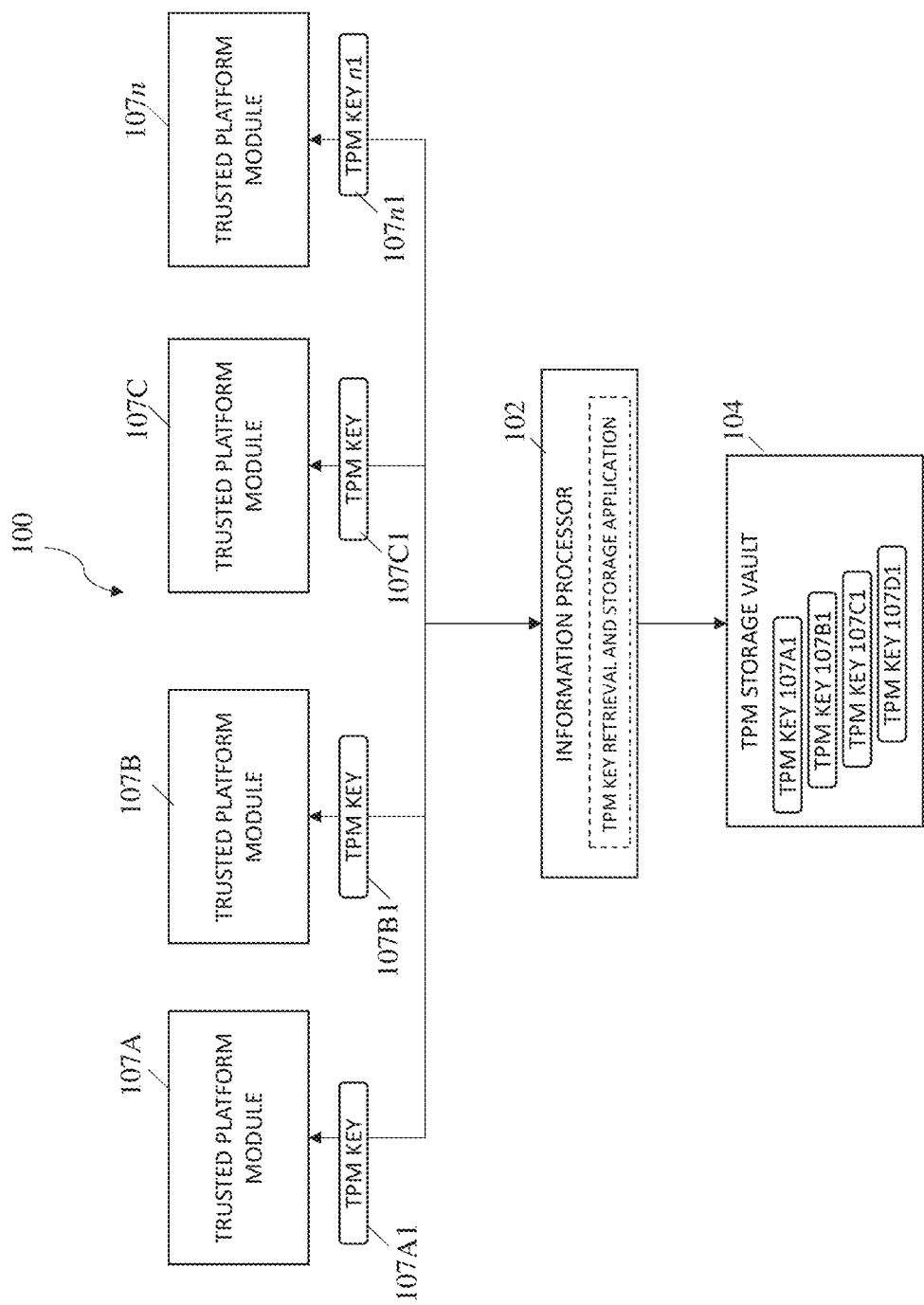
FIG. 3 is a block diagram illustrating an implementation, in which trusted platform modules are shown, each having respective TMP keys.

FIG. 3 is a block diagram illustrating an implementation of system 100, in which trusted platform modules (107A, 107B, 107C, and 107n) are shown, each having respective TMP keys (107A1, 107B1, 107C1, and 107n1). As shown in the example implementation of FIG. 3, information processor 102 is configured to execute TPM encryption recovery key Retrieval Storage Application for interfacing with each trusted platform module 107a, 107b, 107c, and 107n, including to access respective TPM encryption recovery keys 107A1, 107B1, 107C1 and 107n1. Once information processor 102 is further configured to store a copy of at least one of the TPM encryption recovery keys in TPM encryption recovery key storage vault 104. As illustrated in FIG. 3, TPM encryption recovery key storage vault 104 includes TPM encryption recovery keys 107A1, 107B1, 107C1 and 107n1, which have been accessed and copied by information processor 102 executing TPM Key Retrieval Storage Application to TPM key storage vault 104. Details regarding processes associated with information processor 102 executing TPM Key Retrieval Storage Application are provided herein.

Figure 4:
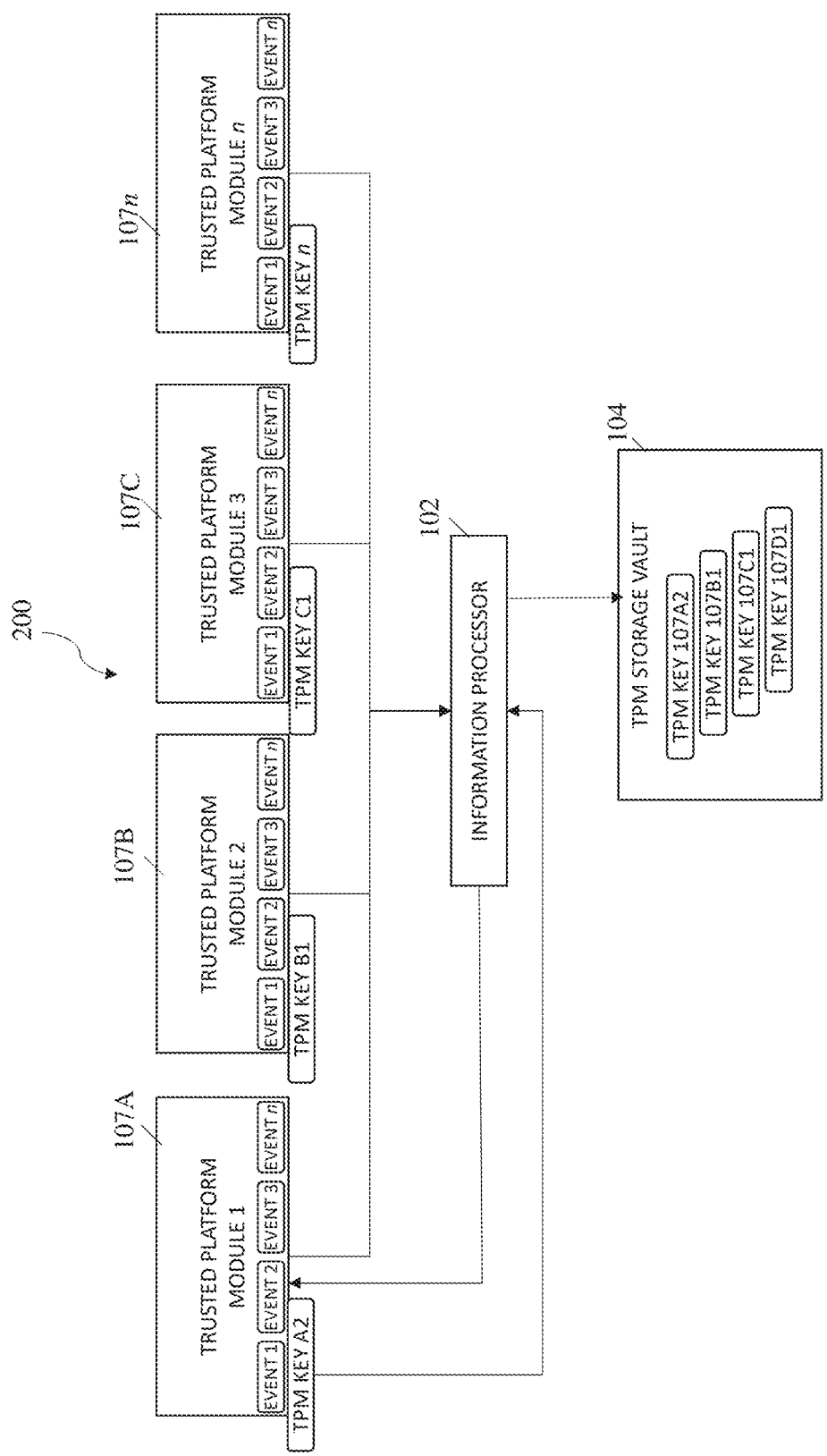
FIG. 4 illustrates a block diagram of a system 100, in accordance with an example implementation of the present disclosure.

FIG. 4 illustrates another example implementation of system 100, also showing trusted platform modules (107A, 107B, 107C, and 107n), each having respective TMP keys (107A1, 107B1, 107C1, and 107n1). In one or more implementations, information processor 102 executes TPM Key Retrieval Storage Application and retrieves TPM encryption recovery keys from respective trusted platform modules 106 that are not stored in TPM key storage vault 104. For example, information processor 102 retrieves all TPM encryption recovery keys from each of the trusted platform modules 107 for copying the TPM encryption recovery keys to TPM key storage vault 104. In one or more implementations, information processor 102 retrieves the TPM encryption recovery keys periodically from the trusted platform modules 107, for example, on a scheduled basis. Alternatively (or in addition), information processor 102 determines when a new TPM encryption recovery key has been (or is to be) generated by one or more trusted platform modules 107 and retrieves that one or more keys for copying to TPM key storage vault 104. For example, information processor 102 can request from the trusted platform modules 107, e.g., via query, application programming interface ("API"), or other suitable way, for information relating a newly generated TPM encryption recovery key or for the newly generated TPM encryption recovery keys, per se. In the example shown in FIG. 4, one new key (TPM encryption recovery key A2 from trusted platform modules 107A) is retrieved by information processor 102 and stored in TPM key storage vault 104. Accordingly, the TPM key storage vault 104 can be updated with new keys.

Figure 5:
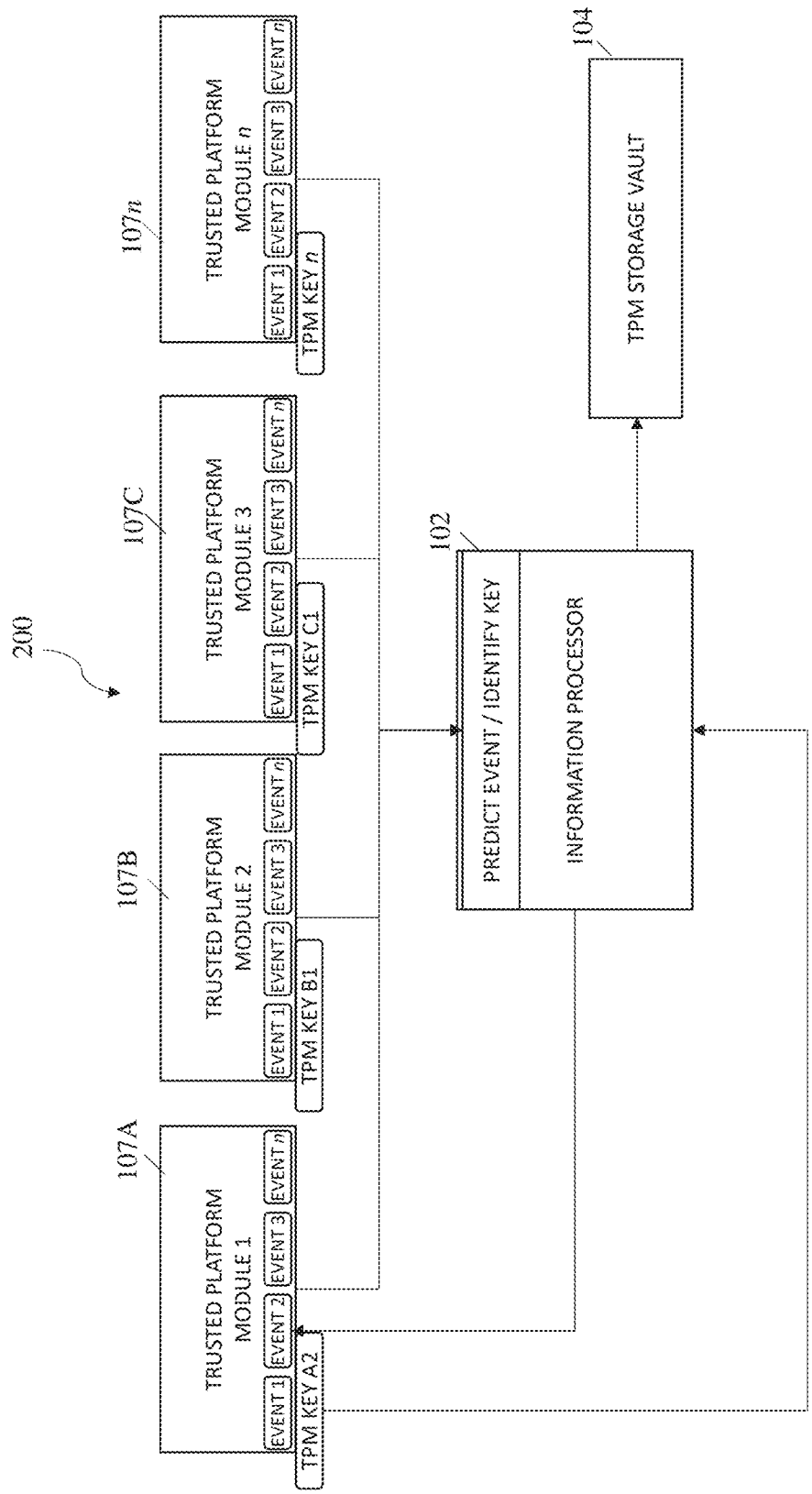
FIG. 5 illustrates an implementation of a system that includes an information processor configured to receive information from the trusted platform modules, including representing an event occurring on respective host devices.

FIG. 5 illustrates an implementation of system 100 that includes information processor 102 configured to receive information from the trusted platform modules 107 representing an event occurring on respective host devices 106. For example, information representing a firmware upgrade that has recently been made is received from trusted platform module 107A by information processor 102. Information processor 102 can determine, for example, by processing the received information from trusted platform module 107A that a new TPM encryption recovery key was generated by the respective host device 106 on which trusted platform module 107A runs. Based on the determination, information processor 102 identifies trusted platform module 107A as having a newly generated key (e.g., TPM encryption recovery key A2 that replaced TPM encryption recovery key A1). Thereafter, information processor 102 retrieves TPM encryption recovery key A2 from trusted platform module 107A for storage in TPM key storage vault 104.

In one or more implementations of the present disclosure, a machine learning model is included to log event information and determine a probability of a particular event resulting in generation of a new TMP key. For example, following reception of event information from a respective trusted platform module 107, a machine learning model (e.g., executing on information processor 102 or a different computing device) uses the information for training, along with a history of tracked TPM encryption recovery keys associated with respective events to provide context, such as for identifying a respective the point of recovery.

In one or more implementations of the present disclosure, events leading up to generation of TPM encryption recovery keys are identified and used to determine causes therefor. For example, a hardware failure of a respective TPM module can require a change to a model or motherboard. Moreover, a firmware update may cause generation of a replacement of a TPM encryption recovery key. In addition, modifications made to a server can indicate a breach of security or related incident. One or more notifications can be generated and sent to a vendor to verify activity associated with a firmware update, for example Accordingly, a machine learning model can be included in the present disclosure for identifying and predicting one or more events which can trigger generation of a new TPM encryption recovery key. The model can be trained by supervised or unsupervised learning, including by using a set of events, in which each event triggers a change that can be used as a ground truth. For example, the model can be trained in a supervised manner using expert-labeled data extracted from one or more central management tools utilizing messaging in a human readable text format, which can be processed using a neural network model.

In one or more implementations of the present disclosure, a selected neutral network model can be an encoder-only transformer e.g., Bidirectional Encoder Representations from Transformers ("BERT"). BERT can employ an encoder-only architecture, can capture contextual information for text classification. For example, text representing an event is tokenized by paring the text into words or subwords. Thereafter, the tokens are converted into numeric representations, for example, by vectorization. The numeric representations can be input a model, and the embeddings incorporated in at least a portion of the model architecture.

Accordingly, in one or more implementations, information processor 102 can receive various textual messages, which can be processed and used to generate information representing a most likely cause of an event (e.g., a change). More particularly, a classification machine learning model can be used to predict the most probable cause for the key change. In such instances, once event information is received by information processor 102, such as in response to a query, API call, or other suitable way, the classification machine learning model can predict that the event resulted in generation of a TPM encryption recovery key. The prediction can be used by information processor 102 to access a newly generated TPM encryption recovery key (e.g., TPM encryption recovery key A2) and save the newly generated TPM encryption recovery key in TPM key storage vault 104. A history of the keys and corresponding events that could have caused the change is maintained, for example, for auditing and investigation purposes.

In one or more implementations of the present disclosure, information processor 102 collects TPM encryption recovery keys from respective trusted platform modules 107 operating on host devices 106. Once received, information processor 102 can push the TPM encryption recovery keys to TPM key storage vault 104. Thereafter, a determination can be made that a TPM encryption recovery key received from a trusted platform module 107 has changed. Based on the determination, a machine learning model can operate to predict the cause of the event, and thereafter the changed TPM encryption recovery key and cause for the event stored in TPM key storage vault 104.

Figure 6:
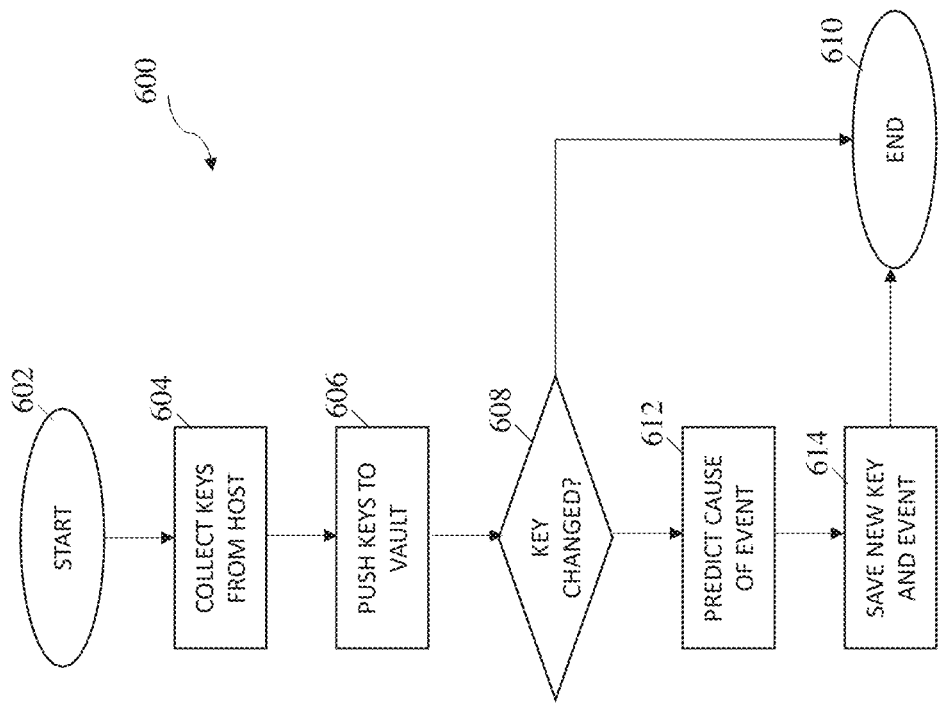
FIG. 6 is a flow chart illustrating process steps that are associated with automatically storing TPM encryption recovery keys, in accordance with an example implementation of the present disclosure.

FIG. 6 is a flow chart illustrating an example process 600 including steps that are associated with automatically storing TPM encryption recovery keys, in accordance with an example implementation of the present disclosure. It should be appreciated that several of the logical operations described herein are implemented (1) as a sequence of computer implemented acts or program modules running on a communication device and/or (2) as interconnected machine logic circuits or circuit modules within a communication device. The implementation is a matter of choice dependent on the requirements of the device (e.g., size, energy, consumption, performance, etc.). Accordingly, the logical operations described herein are referred to variously as operations, structural devices, acts, or modules. Several of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Continuing with reference to FIG. 6, at step 602 the process starts and each of a plurality of TPM encryption recovery keys are collected from host devices 106 (step 604). The keys are, thereafter, pushed to TPM key storage vault 104 (step 606). In step 608, a determination is made whether a TPM encryption recovery key collected from hosts 106 has changed. If not, then the process branches to step 610 and the ends. Alternatively, if the determination in step 608 is affirmative that a key has changed, then the process branches to step 612 and a prediction is made, such as via a machine learning model, of the cause of the event. Thereafter, the process continues to step 614 and the new key and event is saved and the process ends (step 610).

Figure 7:
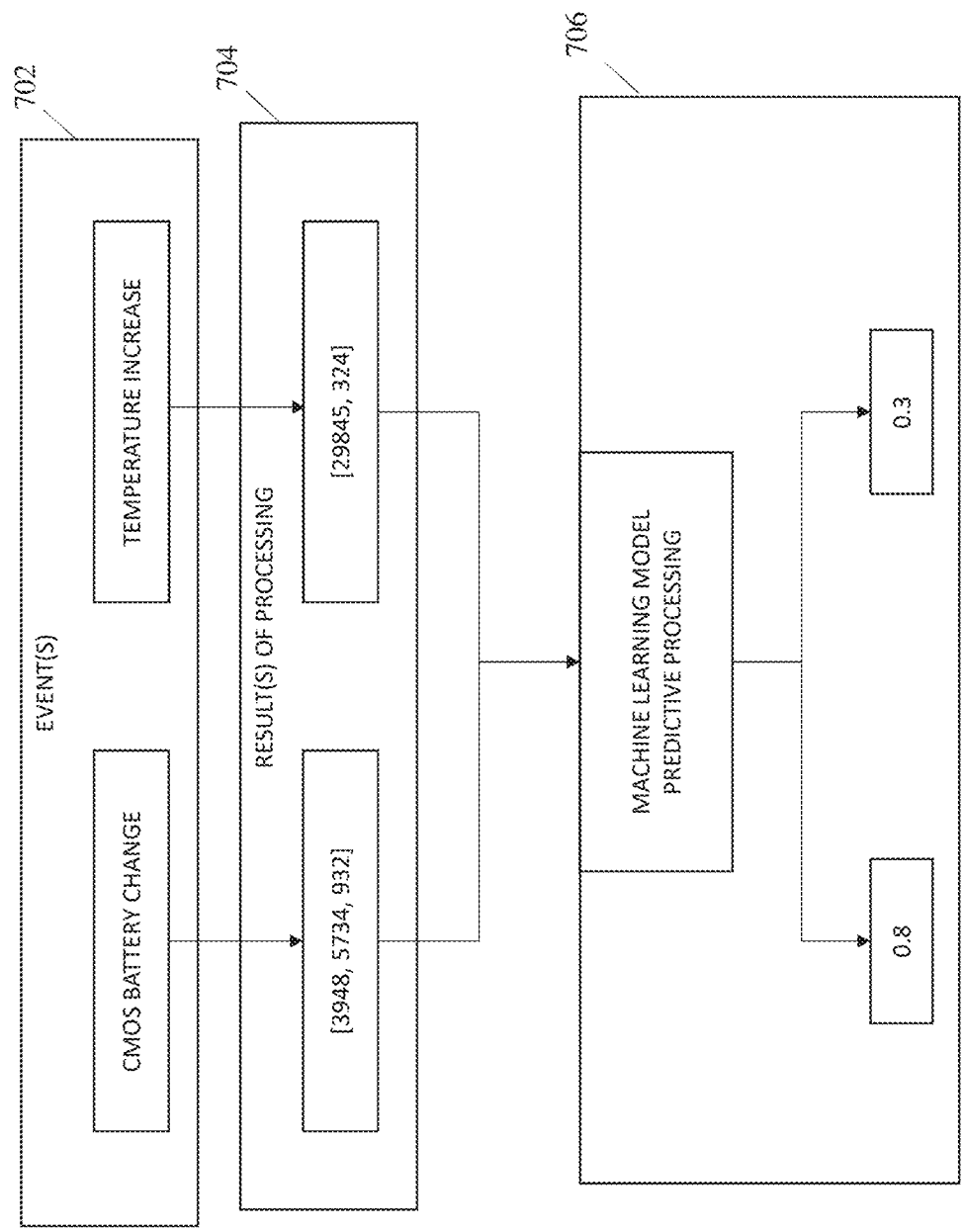
FIG. 7 is a block diagram illustrating information associated with two example events collected during a detected change of TPM encryption recovery keys.

FIG. 7 is a block diagram illustrating information associated with two example events collected during a detected change of TPM encryption recovery keys. For example, in response to one or more data queries of a host device 106, information representing a CMOS battery change is received, and information representing an increase in temperature is received (702). Thereafter, the text is processed, for example, via tokenization and vectorization, and embeddings, and respective values associated with each of the received information is generated (704). The results can be further processed by the machine learning model to generate prediction scores (706). In the example illustrated in FIG. 7, the predicted probability of the event being a CMOS battery change is 0.8 (or 80%) and the predicted probability of the event being a temperature increase is 0.3 (or 30%). It is to be appreciated that FIG. 7 illustrates a simplified process and output, and that actual input and output generated in an implementation of the present disclosure can be different. Input messages, for example, can be of various formats and lengths. Moreover, FIG. 7 illustrates an example of binary classifications generated for particular events and used to determine a probability of an event. Resulting output can be sorted by probability and the event having the highest probability can be selected as the likely causal event. In one or more implementations, one or more processes can be executed automatically, such as to generate alerts representing tickets to hardware management for example for faulty hardware or security personnel if a suspected security event is detected.

The technological features shown and described herein are effective for managing to private hypervisors, which can be the core building block of enterprise-wide hosting of respective information technology services. It is recognized herein that, in addition, the features shown and described herein are applicable in many technological environments. The present disclosure provides technical benefits by eliminating human error in automated processes, increasing security of storing backup keys, providing great human resource savings, as well as financial savings.

The terms "a," "an," and "the," as used in this disclosure, means "one or more," unless expressly specified otherwise.

The term "communicating device," as used in this disclosure, means any hardware, firmware, or software that can transmit or receive data packets, instruction signals or data signals over a communication link. The hardware, firmware, or software can include, for example, a telephone, a smart phone, a personal data assistant (PDA), a smart watch, a tablet, a computer, a software defined radio (SDR), or the like, without limitation.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, an optical communication link, or the like, without limitation. The RF communication link can include, for example, Wi-Fi, WiMAX, IEEE 802.11, DECT, 0G, 1G, 2G, 3G or 4G cellular standards, Bluetooth, or the like, without limitation.

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, or the like, without limitation.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, Wi-Fi, WiMAX, IEEE 802.11, DECT, 0G, 1G, 2G, 3G, 4G, or 5G cellular standards, Bluetooth, or the like.

The terms "transmission" and "transmit," as used in this disclosure, refer to the conveyance of signals via electricity, acoustic waves, light waves and other electromagnetic emissions, such as those generated in connection with communications in the radio frequency (RF) or infrared (IR) spectra. Transmission media for such transmissions can include coaxial cables, copper wire and fiber optics, including the wires that comprise a system bus coupled to the processor.

The term "database," as used in this disclosure, means any combination of software and/or hardware, including at least one disclosure and/or at least one computer. The database can include a structured collection of records or data organized according to a database model, such as, for example, but not limited to at least one of a relational model, a hierarchical model, a network model or the like. The database can include a database management system disclosure (DBMS) as is known in the art. The disclosure may include, but is not limited to, for example, an disclosure program that can accept connections to service requests from clients by sending back responses to the clients. The database can be configured to run the disclosure, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which can be configured to communicate data via a wireless and/or a wired communication medium. These networks can run a variety of protocols not limited to TCP/IP, IRC or HTTP.

The term "server," as used in this disclosure, means any combination of software and/or hardware, including at least one disclosure and/or at least one computer to perform services for connected clients as part of a client-server architecture. The server disclosure can include, but is not limited to, for example, an disclosure program that can accept connections to service requests from clients by sending back responses to the clients. The server can be configured to run the disclosure, often under heavy workloads, unattended, for extended periods of time with minimal human direction. The server can include a plurality of computers configured, with the disclosure being divided among the computers depending upon the workload. For example, under light loading, the disclosure can run on a single computer. However, under heavy loading, multiple computers can be required to run the disclosure. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The invention encompassed by the present disclosure has been described with reference to the accompanying drawings, which form a part hereof, and which show, by way of illustration, example implementations and/or embodiments. As such, the figures and examples above are not meant to limit the scope of the present disclosure to a single implementation, as other implementations are possible by way of interchange of some or all of the described or illustrated elements, without departing from the spirit of the present disclosure. Among other things, for example, the disclosed subject matter can be embodied as methods, devices, components, or systems.

Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

Furthermore, it is recognized that terms used herein can have nuanced meanings that are suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter can be based upon combinations of individual example embodiments, or combinations of parts of individual example embodiments.

The foregoing description of the specific implementations will so fully reveal the general nature of the disclosure that others can, by applying knowledge within the skill of the relevant art(s) (including the contents of the documents cited and incorporated by reference herein), readily modify and/or adapt for various disclosures such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown of drawings are shown accordingly to one example and other dimensions can be used without departing from the present disclosure.

While various implementations of the present disclosure have been described above, it should be understood that they have been presented by way of example, and not limitation. It would be apparent to one skilled in the relevant art(s) that various changes in form and detail could be made therein without departing from the spirit and scope of the disclosure. Thus, the present disclosure should not be limited by any of the above-described example implementations, and the invention is to be understood as being defined by the recitations in the claims which follow and structural and functional equivalents of the features and steps in those recitations.

What is claimed:

1. A computer-implemented method for automatic management of trusted platform module encryption recovery keys, the method comprising:
   generating, by at least one computing device configured by executing instructions stored on non-transitory processor readable media, a first request for a trusted platform module encryption recovery key;
   transmitting, by the computing device to each of a plurality of host computing devices, the first request;
   receiving, by the at least one computing device from each of the plurality of host computing devices in response to the first request, copies of trusted platform module encryption recovery keys, wherein each of the copies of the trusted platform module encryption recovery keys is respectively associated with a trusted platform module operating on a respective host device;
   storing, by the at least one computing device in a storage vault, each of the received trusted platform module encryption recovery keys;
   generating, by the at least one computing device, a second request for a trusted platform module encryption recovery key;
   transmitting, by the computing device to the plurality of host computing devices, the second request;
   receiving, by the at least one computing device from at least one of the plurality of host computing devices in response to the second request, a copy of a different trusted platform module encryption recovery key that was not previously received, wherein each copy of the different trusted platform module encryption recovery key is respectively associated with the at least one trusted platform module operating on the at least one of the plurality of host computing devices;
   determining, by the at least one computing device, that the copy of the different trusted platform module encryption recovery key was not previously stored in the storage vault; and
   storing, by the at least one computing device to the storage vault, the copy of the different trusted platform module encryption recovery key in the storage vault;
   receiving, by the at least one computing device from the at least one of the plurality of host computing devices, information representing a plurality of possible events occurring on the at least one of the plurality of host computing devices resulting in generation of the different trusted platform module encryption recovery key;

generating, by the at least one computing device, a respective probability of each of the plurality of events;

determining, by the at least one computing device as a function of the generated respective probabilities, one of the plurality of events that resulted in the generation of the different trusted platform module encryption recovery key; and storing, by the at least one computing device, information representing the one of the plurality of events.

2. The computer-implemented method of claim 1, wherein the at least one computing device includes a machine learning model and wherein the determining is performed by the machine learning model.

3. The computer-implemented method of claim 2, further comprising:

receiving, by the at least one computing device from the at least one of the plurality of host computing devices, information associated with a plurality of events;

processing, by the at least one computing device, the information associated with the plurality of events to generate processed information; and generating, by the at least one computing device using the processed information, respective prediction scores associated with each of the plurality of events, wherein the determining the one of the plurality of events is based on the respective prediction scores.

4. The computer-implemented method of claim 3, wherein processing, by the at least one computing device, the information associated with the plurality of events to generate processed information includes tokenization, vectorization, and embeddings.

5. The computer-implemented method of claim 1, wherein the request is generated as a function of at least one of a query and an application programming interface.

6. A computer-implemented system for automatic management of trusted platform module encryption recovery keys, the system comprising:

at least one computing device configured by executing instructions stored on non-transitory processor readable media that, when executed by the at least one computing device, cause the at least one computing device performs steps including:

generating a first request for a trusted platform module encryption recovery key;

transmitting, to each of a plurality of host computing devices, the first request;

receiving, from each of the plurality of host computing devices in response to the first request, copies of trusted platform module encryption recovery keys, wherein each of the copies of the trusted platform module encryption recovery keys is respectively associated with a trusted platform module operating on a respective host device;

storing, in a storage vault, each of the received trusted platform module encryption recovery keys;

generating a second request for a trusted platform module encryption recovery key;

transmitting, to the plurality of host computing devices, the second request;

receiving, from at least one of the plurality of host computing devices in response to the second request, a copy of a different trusted platform module encryption recovery key that was not previously received, wherein each copy of the different trusted platform module encryption recovery key is respectively associated with the at least one trusted platform module operating on the at least one of the plurality of host computing devices;

determining that the copy of the different trusted platform module encryption recovery key was not previously stored in the storage vault; and storing, to the storage vault, the copy of the different trusted platform module encryption recovery key in the storage vault;

receiving, from the at least one of the plurality of host computing devices, information representing a plurality of possible events occurring on the at least one of the plurality of host computing devices resulting in generation of the different trusted platform module encryption recovery key;

generating a respective probability of each of the plurality of events;

determining, as a function of the generated respective probabilities, one of the plurality of events that resulted in the generation of the different trusted platform module encryption recovery key; and storing information representing the one of the plurality of events.

7. The computer-implemented system of claim 6, wherein the at least one computing device includes a machine learning model and wherein the determining is performed by the machine learning model.

8. The computer-implemented system of claim 7, wherein, when executing by the at least one computing device the instructions, the at least one computing device is further configured to perform steps including:

receiving, from the at least one of the plurality of host computing devices, information associated with a plurality of events;

processing the information associated with the plurality of events to generate processed information; and generating, using the processed information, respective prediction scores associated with each of the plurality of events, wherein the determining the one of the plurality of events is based on the respective prediction scores.

9. The computer-implemented system of claim 8, wherein processing, by the at least one computing device, the information associated with the plurality of events to generate processed information includes tokenization, vectorization, and embeddings.

10. The computer-implemented system of claim 6, wherein the request is generated as a function of at least one of a query and an application programming interface.

11. A non-transitory computer readable storage medium storing computer program instructions that, when executed by at least one computing device, cause the at least one computing device to perform steps including:

generating a first request for a trusted platform module encryption recovery key;

transmitting, to each of a plurality of host computing devices, the first request;

receiving, from each of the plurality of host computing devices in response to the first request, copies of trusted platform module encryption recovery keys, wherein each of the copies of the trusted platform module encryption recovery keys is respectively associated with a trusted platform module operating on a respective host device;

storing, in a storage vault, each of the received trusted platform module encryption recovery keys;

generating a second request for a trusted platform module encryption recovery key;

transmitting, to the plurality of host computing devices, the second request;

receiving, from at least one of the plurality of host computing devices in response to the second request, a copy of a different trusted platform module encryption recovery key that was not previously received, wherein each copy of the different trusted platform module encryption recovery key is respectively associated with the at least one trusted platform module operating on the at least one of the plurality of host computing devices;

determining that the copy of the different trusted platform module encryption recovery key was not previously stored in the storage vault; and storing, to the storage vault, the copy of the different trusted platform module encryption recovery key in the storage vault;

receiving, from the at least one of the plurality of host computing devices, information representing a plurality of possible events occurring on the at least one of the plurality of host computing devices resulting in generation of the different trusted platform module encryption recovery key;

generating a respective probability of each of the plurality of events;

determining, as a function of the generated respective probabilities, one of the plurality of events that resulted in the generation of the different trusted platform module encryption recovery key; and storing information representing the one of the plurality of events.

12. The non-transitory computer readable storage medium in claim 11, wherein the at least one computing device includes a machine learning model and wherein the determining is performed by the machine learning model.

13. The non-transitory computer readable storage medium in claim 12, storing further computer program instructions that, when executed by the at least one computing device, cause the at least one computing device to perform steps including:

receiving, from the at least one of the plurality of host computing devices, information associated with a plurality of events;

processing the information associated with the plurality of events to generate processed information; and generating, using the processed information, respective prediction scores associated with each of the plurality of events, wherein the determining the one of the plurality of events is based on the respective prediction scores.

14. The non-transitory computer readable storage medium in claim 13, wherein processing, by the at least one computing device, the information associated with the plurality of events to generate processed information includes tokenization, vectorization, and embeddings.

15. The non-transitory computer readable storage medium in claim 11, wherein the request is generated as a function of at least one of a query and an application programming interface.

* * * * *